United States Patent
Arend et al.

(10) Patent No.: US 7,653,385 B2
(45) Date of Patent: Jan. 26, 2010

(54) WIRELESS TELECOMMUNICATIONS SIGNAL INHIBITION

(76) Inventors: Brian L. Arend, P.O. Box 321, Masonville, CO (US) 80541; Alfredo E. Gonzalez, 2902 Shadow Creek Dr., Apt. 203, Boulder, CO (US) 80303; Charles I. Cook, 182 Cherrywood La., Louisville, CO (US) 80027

( * ) Notice: Subject to any disclaimer, the term of this patent is extended or adjusted under 35 U.S.C. 154(b) by 2077 days.

(21) Appl. No.: 09/770,551

(22) Filed: Jan. 26, 2001

(65) Prior Publication Data

US 2002/0102968 A1    Aug. 1, 2002

(51) Int. Cl.
*H04W 4/00* (2006.01)
(52) U.S. Cl. .................................. 455/422.1
(58) Field of Classification Search ............ 455/560, 455/414.1, 422.1, 418, 1, 419, 456.1–456.4, 455/63.1–63.4, 409, 403, 431, 528, 69, 440, 455/194.1, 565, 574, 410, 461, 446, 550, 455/507, 428, 521; 340/531; 342/357.1, 342/9, 357.14, 450, 457, 463, 375.14, 375.13, 342/357.13
See application file for complete search history.

(56) References Cited

U.S. PATENT DOCUMENTS

| | | | |
|---|---|---|---|
| 4,103,236 A | 7/1978 | Deserno et al. | |
| 4,219,891 A | 8/1980 | Weiss et al. | |
| 4,247,946 A | 1/1981 | Mawhinney | |
| 4,498,193 A | 2/1985 | Richardson | |
| 5,001,771 A | 3/1991 | New | |
| 5,224,150 A * | 6/1993 | Neustein | 340/7.44 |
| 5,442,805 A * | 8/1995 | Sagers et al. | 455/456.5 |
| 6,163,695 A * | 12/2000 | Takemura | 455/456.4 |
| 6,222,458 B1 * | 4/2001 | Harris | 340/686.6 |
| 6,343,213 B1 * | 1/2002 | Steer et al. | 455/411 |
| 6,393,254 B1 * | 5/2002 | Pousada Carballo et al. | 455/1 |
| 6,429,768 B1 * | 8/2002 | Flick | 340/5.2 |
| 6,438,385 B1 * | 8/2002 | Heinonen et al. | 455/501 |
| 6,490,455 B1 * | 12/2002 | Park et al. | 455/456.4 |
| 6,570,689 B1 * | 5/2003 | Kushita | 398/132 |
| 6,675,002 B1 * | 1/2004 | Lipovski | 455/194.1 |
| 6,687,497 B1 * | 2/2004 | Parvulescu et al. | 455/420 |
| 6,687,506 B1 * | 2/2004 | Girod | 455/456.4 |
| 6,832,093 B1 * | 12/2004 | Ranta | 455/456.4 |
| 2001/0009857 A1 * | 7/2001 | Vanttinen | 455/456 |

FOREIGN PATENT DOCUMENTS

| | | | |
|---|---|---|---|
| WO | WO 98/18232 | * | 8/1997 |
| WO | WO 98/34412 | * | 6/1998 |

* cited by examiner

Primary Examiner—Melody Mehrpour

(57) ABSTRACT

Wireless telecommunications is inhibited within a limited region by generating a noise signal within a frequency range of the wireless telecommunications and broadcasting the noise signal into the limited region. A system for inhibiting wireless communications includes a radio frequency noise generator generating a noise signal within a frequency range of the wireless telecommunication. At least one antenna broadcasts the noise signal into the region. Control logic initiates or suspends broadcasting of the noise signal based on at least one control input.

21 Claims, 4 Drawing Sheets

WIRELESS TELECOMMUNICATIONS SIGNAL INHIBITION

TECHNICAL FIELD

The present invention relates to inhibiting operations of wireless transceivers such as telephones.

BACKGROUND ART

The use of wireless communication devices, such as cellular and PCS telephones, pagers, personal digital assistants (PDAs), and the like, have become ubiquitous. Such devices offer many advantages including the ability to establish communication at almost any location and at almost any time. Thus, wireless users can talk with friends and colleagues, receive updates on the weather or the stock market, send and receive e-mail, receive audible alarms for important events, and many other useful activities.

While wireless communication undoubtedly brings many benefits, there are occasionally some drawbacks. The ringing of a wireless telephone is an unwanted event at public performances such as movies, plays, lectures, concerts, and the like. Portable wireless devices may create a distraction to learning in schools. Operation of a wireless handset may create a hazardous distraction to vehicle operators. Operation of various wireless devices may also interfere with the safe operation of commercial aircraft.

DISCLOSURE OF INVENTION

The present invention inhibits wireless telecommunications within a limited region by generating a noise signal within a frequency range of the wireless telecommunications and broadcasting the noise signal into the limited region.

A system for inhibiting wireless communication within a limited region is provided. The system includes a radio frequency noise generator generating a noise signal within a frequency range of the wireless telecommunication. At least one antenna broadcasts the noise signal into the region. Control logic initiates or suspends broadcasting of the noise signal based on at least one control input.

In an embodiment of the present invention, the radio frequency noise generator includes a wide band noise source generating a wide band noise signal. A band pass filter accepts the wide band noise signal and produces the noise signal within the frequency range of wireless telecommunication. If the wireless telecommunications is through spread spectrum, the noise signal is generated across substantially the entire spectrum.

In another embodiment of the present invention, the limited region encompasses a public event. The control signal is generated based on a condition occurring at the public event.

In yet another embodiment of the present invention, the limited region is inside of a vehicle, such as an aircraft or an automobile. The control signal may be based on detecting the presence of a telephone in a cradle. The control signal may also be based on detecting at least one condition of the vehicle.

In still another embodiment of the present invention, the system includes a plurality of radio frequency noise generators, each generating a noise signal within a portion of the frequency range of wireless telecommunications. An antenna receives the noise signal from each noise generator. Each antenna has a coverage area. The limited region of telecommunications coverage is formed by overlapping antenna coverage areas.

The above objects and features as well as other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
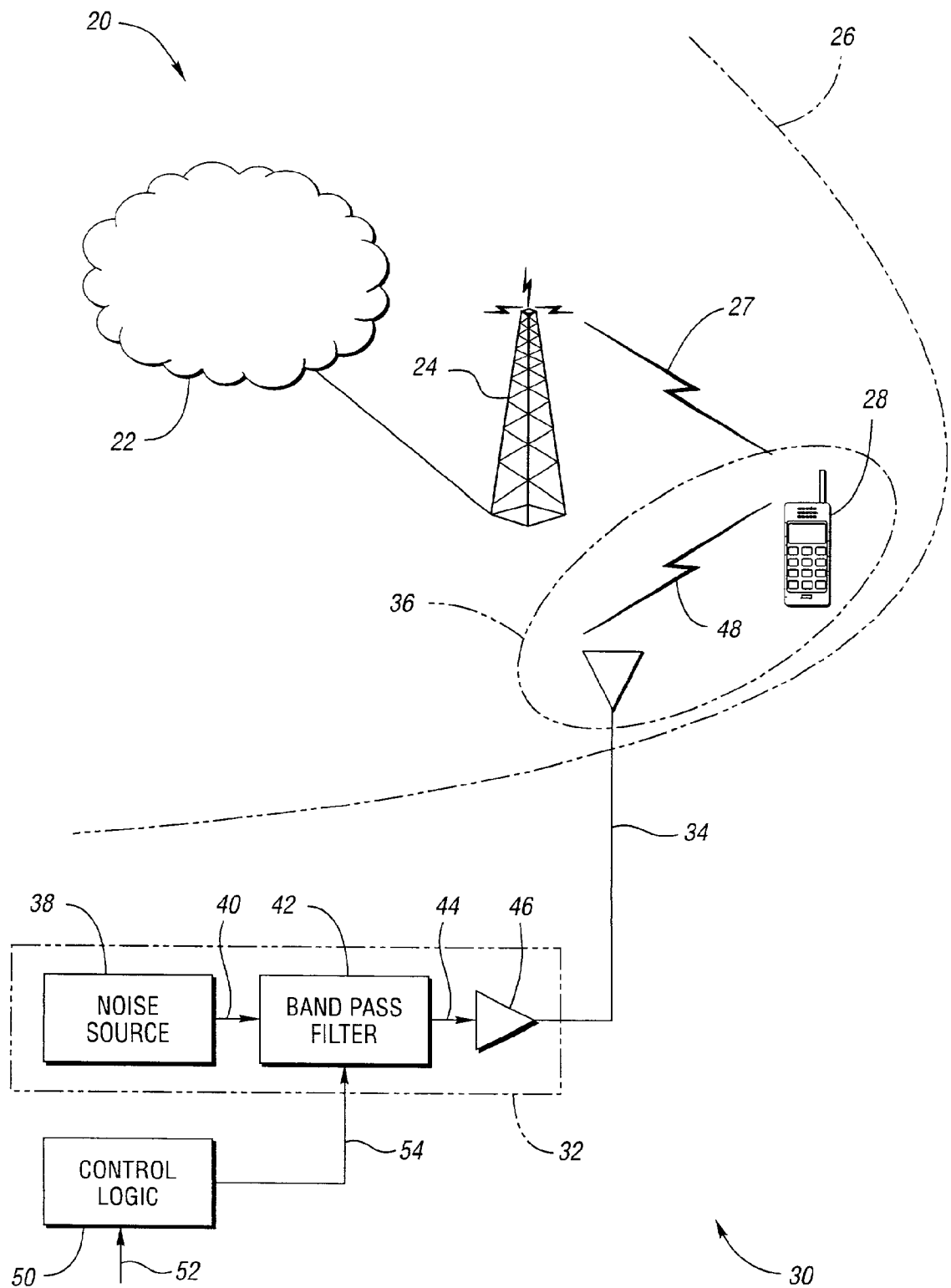
FIG. 1 is a block diagram illustrating a telecommunications inhibition system according to an embodiment of the present invention.

Referring to FIG. 1, a block diagram illustrating a telecommunications inhibition system according to an embodiment of the present invention is shown. A wireless telecommunications system, shown generally by 20, includes distribution network 22 for routing information to and from a plurality of antennas, one of which is indicated by 24. Distribution network 22 may include one or more of routers, multiplexors, switches, mobile switching centers, base station controllers, and the like. The effective ranges of antennas 24 establish telecommunications coverage area 26. Wireless communication device 28 within telecommunications coverage area 26 establishes wireless link 27 with distribution network 22 through one or more antennas 24. Wireless communication device 28 may be any device capable of establishing wireless communication with distribution network 22 or directly with another wireless device 28.

A wireless telecommunications inhibition system, shown generally by 30, includes at least one radio frequency noise generator 32 driving at least one antenna 34. Each antenna 34 radiates a low level noise signal cancelling, blocking, interfering, or otherwise inhibiting communication link 27 established between wireless communication device 28 and antenna 24 within limited region 36. Limited region 36 may be defined by an enclosed or partially enclosed structure, such as a building, room, hall, vehicle, arena, stadium, or the like. Limited region 36 may also be a non-enclosed space defined by overlapping regions radiated from more than one antennas 34.

Wireless telecommunications inhibition system 30 includes noise source 38 generating broadband noise 40. Noise source 38 typically includes a device, such as a diode, for generating broadband noise and may also include a broadband amplifier. As will be recognized by one of ordinary skill in the art, there are many other techniques for generating broadband noise 40, such as a white gaussian noise generator, any of which may be used in the present invention. The spectral coverage of broadband noise 40 depends on the spectrum of communications link 27. A sufficient overlap of spectral content between communications link 27 and broadband noise 40 must be substantial enough to inhibit reception of communications link 27.

Band pass filter 42 accepts broadband noise 40 and produces filtered noise 44. Filtered noise 44 has at least some components within the frequency range of wireless telecommunications system 20. In one embodiment, filtered noise 44 covers substantially all of the spectrum of a spread spectrum signal transmitted by antenna 24. In another embodiment, filtered noise 44 covers only a portion of the frequency range used by wireless telecommunications system 20. In yet another embodiment, a plurality of filtered noise signals 44 having differing spectral components are transmitted into limited region 36. Amplifier 46 amplifies filtered noise 44 to produce noise signal 48 broadcast by antenna 34.

Band pass filter 42 shapes broadband noise 40 to match the bands of operation of wireless communications device 28 to interfere with the operation of wireless communications device 28 within telecommunications system 20. Band pass filter 42 may also shape broadband noise 40 to target specific technologies, such as wideband or narrowband, TDMA or CDMA, and the like.

Wireless telecommunications inhibition system 30 includes control logic 50 accepting one or more control inputs 52 and generating one or more control outputs 54 to radio frequency noise generator 32. Control outputs 54 control one or more operating parameters of radio frequency noise generator 32 including the on/off state, output noise power, noise spectral components, and the like.

Control logic 50 generates control outputs 54 based on the application for wireless telecommunications inhibition system 30 and on control inputs 52. For example, limited region 36 might be defined as an area for viewing, listening to, or participating in a public event. Control logic 50 may activate wireless telecommunications inhibition system 30 based on a manual switch. Noise signal 48 may also be generated by dimming house lights, turning on microphones, running a projector, opening curtains, or other triggering events. Control inputs 52 may be generated by clocks, timers, electric eyes, or other sensors. Control inputs may also be generated remotely by a variety of means including via infrared link, sonic link, ultrasonic link, radio link, wired link, or the like.

In another embodiment, limited region 36 might include the interior of a commercial airliner. Noise signal 48 may be generated prior to taxiing, as a reminder to turn off all wireless devices 28 which may interfere with operations of the aircraft.

Figure 2:
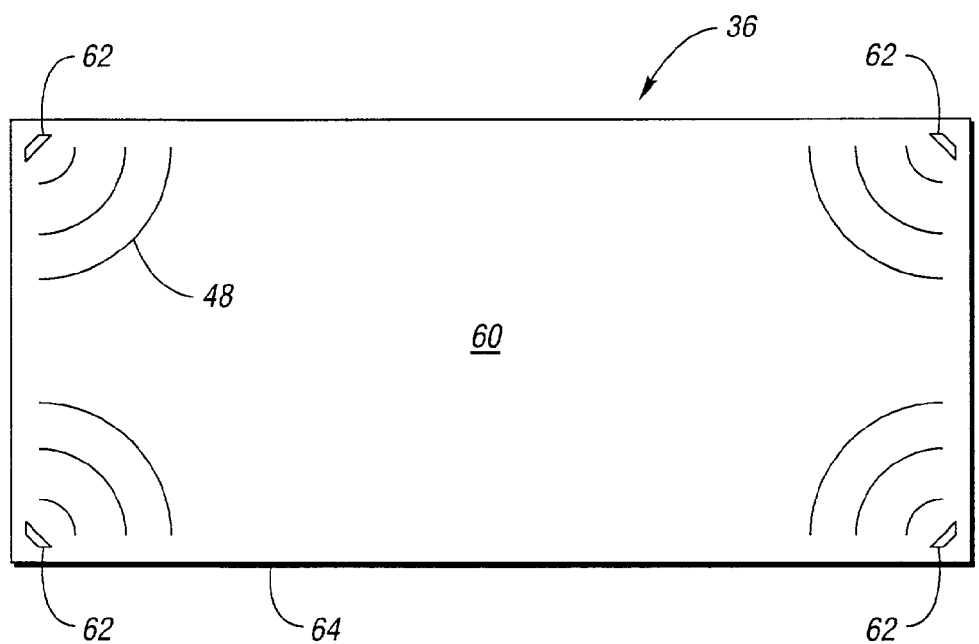
FIG. 2 is a block diagram illustrating directional antennas used to inhibit telecommunications within an enclosed limited region according to an embodiment of the present invention.

Referring now to FIG. 2, a block diagram illustrating directional antennas used to inhibit telecommunications within an enclosed limited region according to an embodiment of the present invention is shown. Limited region 36 may include an enclosed space, indicated by 60, having one or more directional antennas 62 radiating into enclosed space 60. Since noise signal 48 has relatively low power, walls 64 defining enclosed space 60 will effectively attenuate noise signal 48 penetrating beyond walls 64. In certain applications, walls 64 may include shielding to further constrain noise signal 48.

Figure 3:
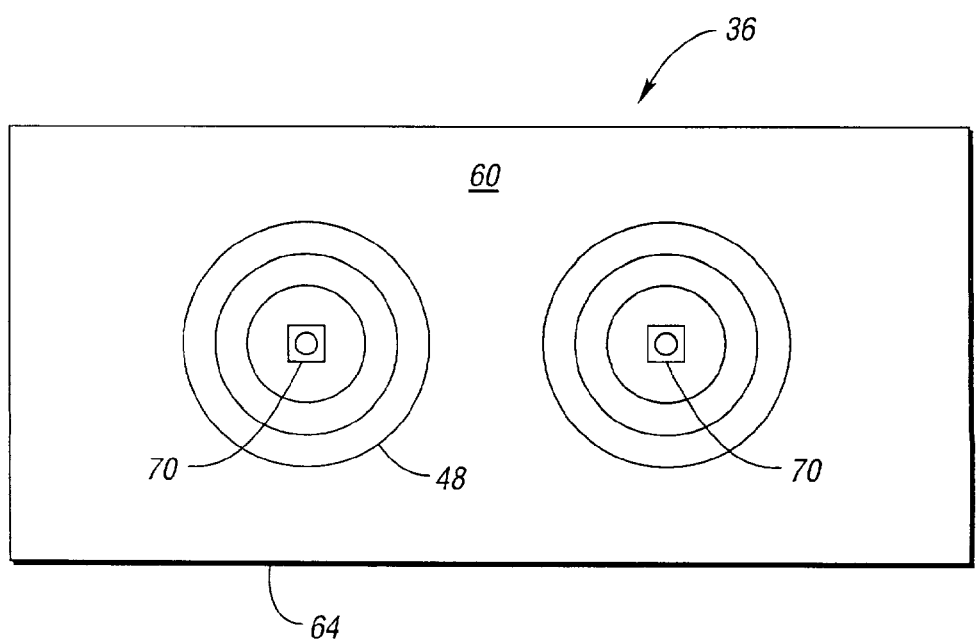
FIG. 3 is a block diagram illustrating omnidirectional antennas used to inhibit telecommunications within an enclosed limited region according to an embodiment of the present invention.

Referring now to FIG. 3, a block diagram illustrating omnidirectional antennas used to inhibit telecommunications within an enclosed limited region according to an embodiment of the present invention is shown. Enclosed space 60 may include one or more omnidirectional antennas 70 in addition to or instead of directional antennas 62 for creating limited range 36 within enclosed space 60. Walls 64 defining enclosed space 60 should, once again, effectively confine noise signal 48 to within enclosed space 60.

Figure 4:
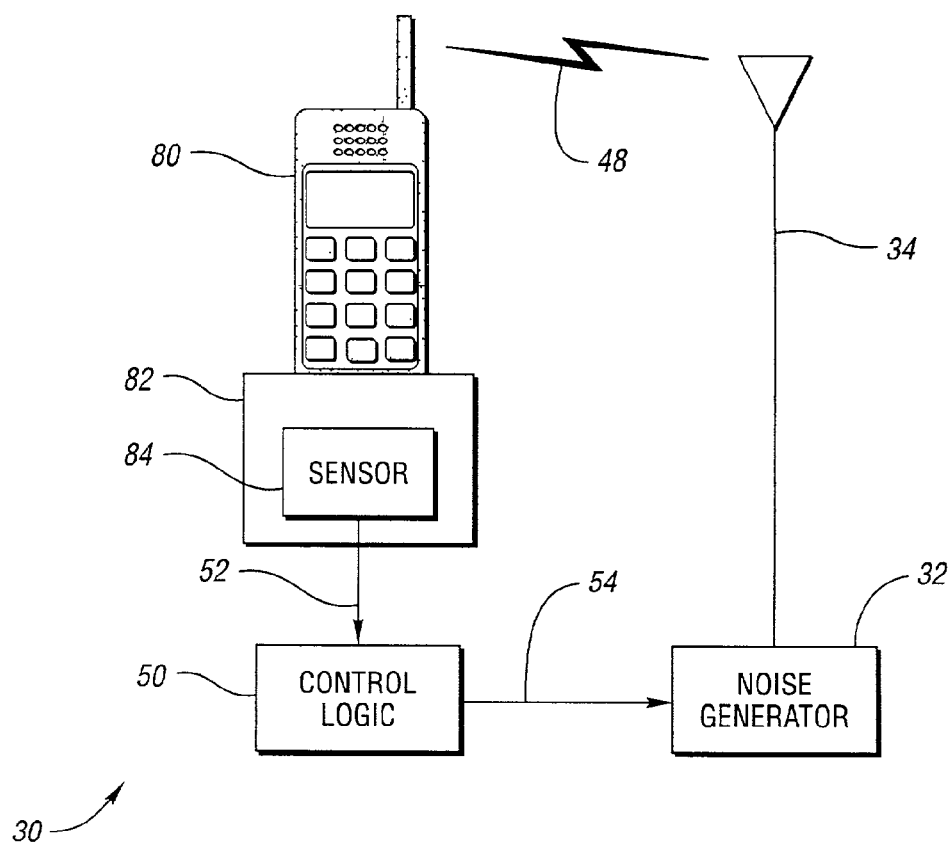
FIG. 4 is a block diagram illustrating a telecommunications inhibition system based on detecting the presence of a handset in a cradle according to an embodiment of the present invention.

Referring now to FIG. 4, a block diagram illustrating a telecommunications inhibition system based on detecting the presence of a handset in a cradle according to an embodiment of the present invention is shown. Hands-free operation may reduce the distraction of using wireless telephones in motor vehicles. To encourage hands-free operation, wireless telecommunications inhibition system 30 may generate noise signal 48 whenever wireless handset 80 is not seated in cradle 82 affixed to, for example, the vehicle dashboard or console. Cradle 82 includes one or more sensors 84 for detecting the presence of wireless handset 80. Sensor 84 may be a mechanical switch detecting the insertion of wireless handset 80 into cradle 82, may be a proximity sensor, may sense electrical power being delivered to wireless handset 80, or the like. Sensor 84 generates control input 52 to control logic 50 for controlling noise generator 32 through control output 54.

Figure 5:
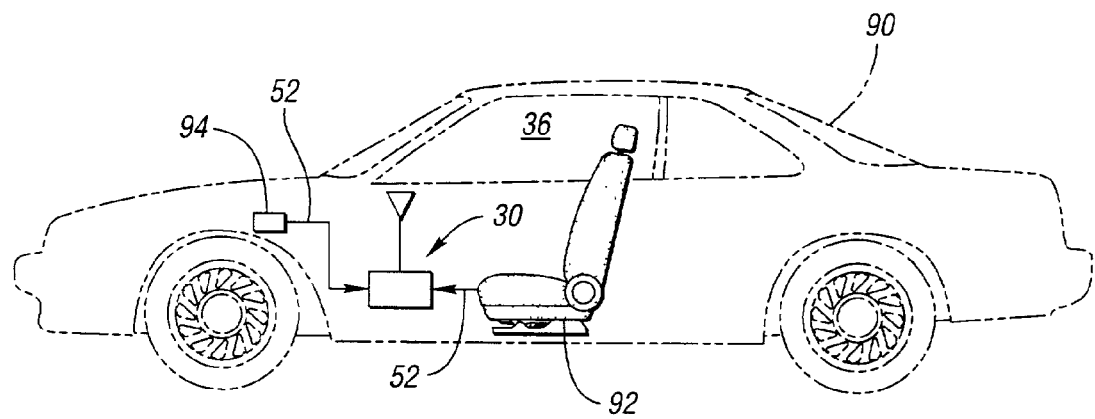
FIG. 5 is a block diagram illustrating telecommunications inhibition based on conditions within a motor vehicle according to an embodiment of the present invention.

Referring now to FIG. 5, a block diagram illustrating telecommunications inhibition based on conditions within a motor vehicle according to an embodiment of the present invention is shown. In addition to or instead of cradle 82, automotive vehicle 90 may include one or more sensors detecting at least one condition of vehicle 90. For example, operator sensor 92 may detect the presence of an operator within vehicle 90. If wireless telecommunications inhibition system 30 receives control input 52 indicating the presence of a vehicle operator, noise signal 48 is generated. Additional sensors, indicated by status sensor 94, may provide control input 52. Noise signal 48 may be generated if vehicle 90 is placed in gear. Noise signal 48 may be generated if vehicle 90 is sensed to be in motion. Control input 52 may be triggered by output from a GPS system to generate noise signal 48 if vehicle 90 is within a particular geographic area, such as a municipality that bans the use of portable telephones while operating vehicle 90, a military installation, a medical facility, or the like.

Figure 6:
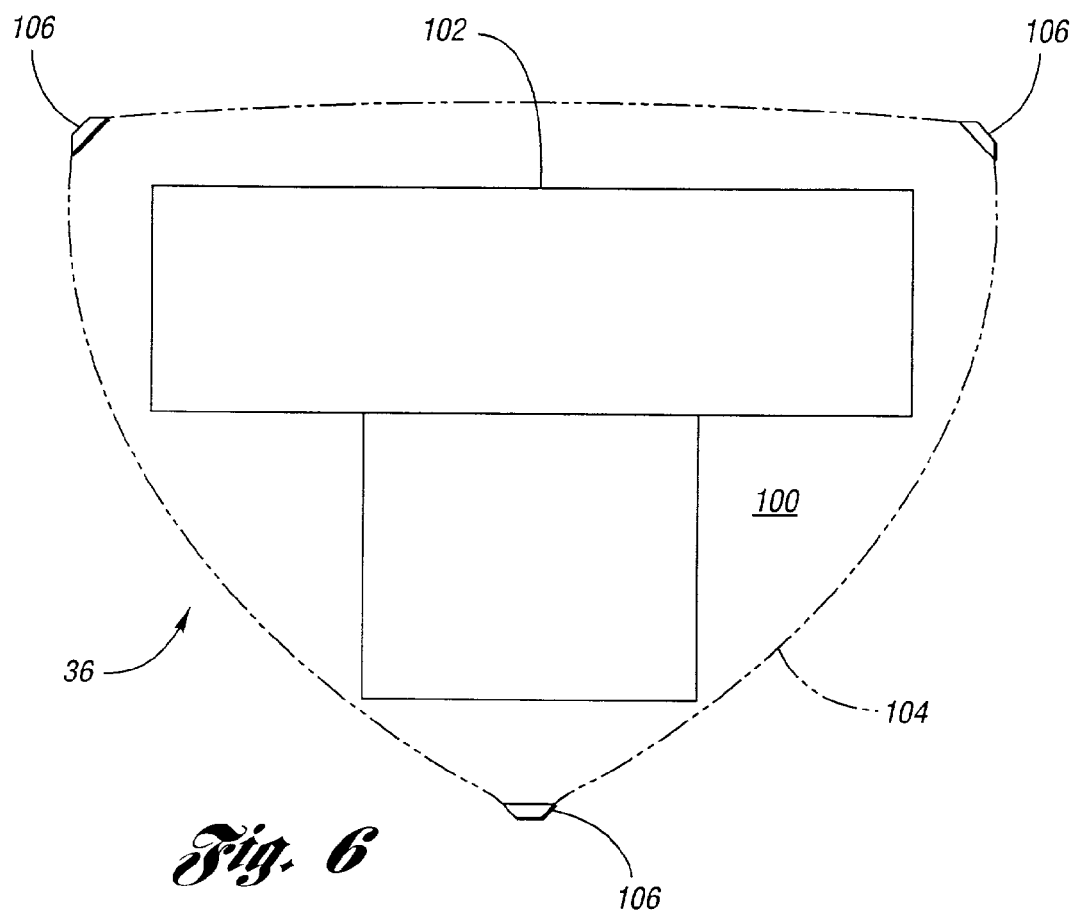
FIG. 6 is a block diagram illustrating telecommunications inhibition in a limited region formed by overlapping antenna coverage according to an embodiment of the present invention.

Referring now to FIG. 6, a block diagram illustrating telecommunications inhibition in a limited region formed by overlapping antenna coverage according to an embodiment of the present invention is shown. Wireless communications may be inhibited in limited region 36 including partially enclosed or unenclosed space 100. For example, unenclosed space 100 may include a school yard enclosing school building 102. Unenclosed space 100 corresponds to overlapping antenna coverage area 104 formed by two or more antennas, such as directional antennas 106. Noise signal 48 may be effectively limited to within unenclosed space 100 by controlling the amplitude of noise signal 48. Noise signal 48 may also be effectively limited to within unenclosed space 100 by controlling the spectral characteristics of noise signal 48.

Figure 7A:
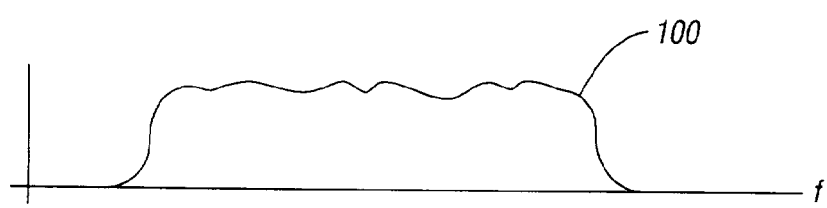
FIG. 7a is a frequency spectrum plot of a spread spectrum telecommunications signal.

Referring now to FIG. 7a, a frequency spectrum plot of a spread spectrum telecommunications signal is shown. Spread spectrum signal 110 may contain frequency components across a broad region of the spectrum. Typically, multiple simultaneous communications occur within the same spread spectrum frequency band 110. Spread spectrum signals are highly resistant to noise and jamming due to their wide spectral content. One technique that may be used is to generate a single wide band noise signal that covers substantially the entire range of spread spectrum frequency band 110.

Figure 7B:
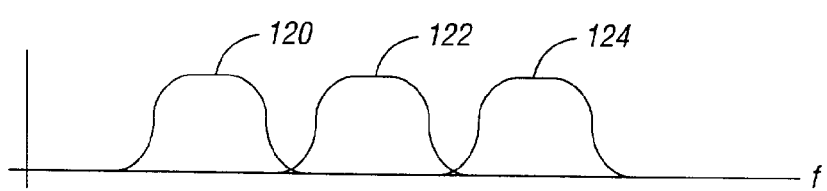
FIG. 7b is a frequency spectrum plot of noise signals that may be combined to inhibit the telecommunications signal of FIG. 7a according to an embodiment of the present invention.

Referring now to FIG. 7b, a frequency spectrum plot of noise signals that may be combined to inhibit the telecommunications signal of FIG. 7a according to an embodiment of the present invention is shown. In order to inhibit spread spectrum signal 110 within coverage area 36, a plurality of noise signals 48 each having varying spectral composition may be used. For example, noise signal spectrum 120 may cover a first portion of spread spectrum signal 110, noise signal spectrum 122 may cover a second portion of spread spectrum signal 110, and noise signal spectrum 124 may cover a third portion of spread spectrum signal 110. Thus, in an area of overlapping coverage by signals 120, 122, 124, spread spectrum signal 110 is effectively inhibited. However, in an area covered by only one of noise signals 120, 122, 124 a sufficient portion of spread spectrum signal 110 remains uninterfered as to permit wireless communication. The spectrums 120, 122, 124 shown in FIG. 7b are substantially separate. However, the spectrums may overlap or may be interspersed.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for inhibiting wireless telecommunications within a limited region of the telecommunications coverage comprising:
   generating a plurality of noise signals, each signal within a different portion of the frequency range of the wireless telecommunications; and
   broadcasting the plurality of noise signals from different locations into the region such that telecommunications is inhibited in the overlap of the broadcasted noise signals, wherein the region comprises an interior of an automotive vehicle; and
   controlling the broadcasting of the plurality of noise signals based on detecting the presence of a telephone in a cradle.

2. A method for inhibiting wireless telecommunications as in claim 1 wherein generating the plurality of noise signals comprises generating at least one wide band noise signal and band pass filtering the wide band noise signal.

3. A method for inhibiting wireless telecommunications as in claim 1 wherein broadcasting the plurality of noise signals comprises broadcasting using at least one directional antenna to achieve the limited region.

4. A method for inhibiting wireless telecommunications as in claim 1 wherein the wireless telecommunications is through spread spectrum, the plurality of noise signals generated substantially across the spread spectrum.

5. A method for inhibiting wireless telecommunications as in claim 1 further comprising controlling broadcasting the plurality of noise signals based on a public event.

6. A method for inhibiting wireless telecommunications as in claim 5 wherein the broadcast of the plurality of noise signals is automatically based on at least one condition of the public event.

7. A method for inhibiting wireless telecommunications as in claim 1 further comprising controlling broadcasting the plurality of noise signals based on detecting at least one condition of the automotive vehicle.

8. A system for inhibiting wireless telecommunications within a limited region of the telecommunications coverage comprising:
   a plurality of radio frequency noise generators, each generator generating a noise signal within a different portion of the frequency range of the wireless telecommunications;
   a plurality of antennas, each antenna in communication with one of the generators, each antenna having an antenna coverage area, the limited region of the telecommunications coverage formed by overlapping antenna coverage areas, wherein the limited region comprises an interior of a vehicle; and
   control logic operative to initiate or suspend broadcasting of each noise signal based on one or more control inputs, wherein the one or more control inputs comprise at least one control input based on detecting the presence of a telephone in a cradle.

9. A system for inhibiting wireless telecommunications as in claim 8 wherein at least one of the plurality of radio frequency noise generators comprises:
   a wide band noise source generating a wide band noise signal; and
   a band pass filter accepting the wide band noise signal and producing the noise signal within the frequency range of the wireless telecommunication.

10. A system for inhibiting wireless telecommunications as in claim 8 wherein the wireless telecommunications is through spread spectrum, the noise signal generated by the plurality of radio frequency noise generators extends substantially across the spread spectrum.

11. A system for inhibiting wireless telecommunications as in claim 8 wherein the region encompasses a public event, the at least one control input based on a condition occurring at the public event.

12. A system for inhibiting wireless telecommunications as in claim 8 wherein the vehicle is an automotive vehicle.

13. A system for inhibiting wireless telecommunications as in claim 8 wherein the one or more control inputs further comprise at least one control input that is based on detecting at least one condition of the vehicle.

14. A method for inhibiting wireless telecommunications within a limited region of the telecommunications coverage comprising:
   generating a plurality of noise signals, each signal within a different portion of the frequency range of the wireless telecommunications; and
   broadcasting the plurality of noise signals from different locations into the region such that telecommunications is inhibited in the overlap of the broadcasted noise signals, wherein the region comprises an interior of an aircraft;
   wherein generating the plurality of noise signals comprises generating at least one wide band noise signal and band pass filtering the wide band noise signal.

15. A method for inhibiting wireless telecommunications as in claim 14 wherein broadcasting the plurality of noise signals comprises broadcasting using at least one directional antenna to achieve the limited region.

16. A method for inhibiting wireless telecommunications within a limited region of the telecommunications coverage, wherein the wireless telecommunications is through spread spectrum, the method comprising:
   generating a plurality of noise signals, each signal within a different portion of the frequency range of the wireless telecommunications; and generating a plurality of noise signals substantially across the spread spectrum, each signal within a different portion of the frequency range of the wireless telecommunications; and broadcasting the plurality of noise signals from different locations into the region such that telecommunications is inhibited in the overlap of the broadcasted noise signals, wherein the region comprises an interior of an aircraft.

17. A method for inhibiting wireless telecommunications within a limited region of the telecommunications coverage comprising:

generating a plurality of noise signals, each signal within a different portion of the frequency range of the wireless telecommunications;

broadcasting the plurality of noise signals from different locations into the region such that telecommunications is inhibited in the overlap of the broadcasted noise signals, wherein the region comprises an interior of an aircraft; and controlling broadcasting the plurality of noise signals based on detecting at least one condition of the aircraft.

18. A system for inhibiting wireless telecommunications within a limited region of the telecommunications coverage comprising:

a plurality of radio frequency noise generators, each generator generating a noise signal within a different portion of the frequency range of the wireless telecommunications;

a plurality of antennas, each antenna in communication with one of the generators, each antenna having an antenna coverage area, the limited region of the telecommunications coverage formed by overlapping antenna coverage areas; wherein the limited region comprises an interior of an aircraft; and control logic operative to initiate or suspend broadcasting of each noise signal based on one or more control inputs.

19. A system for inhibiting wireless telecommunications as in claim 18 wherein at least one of the plurality of radio frequency noise generators comprises:

a wide band noise source generating a wide band noise signal; and a band pass filter accepting the wide band noise signal and producing the noise signal within the frequency range of the wireless telecommunication.

20. A system for inhibiting wireless telecommunications as in claim 18 wherein the wireless telecommunications is through spread spectrum, the noise signal generated by the plurality of radio frequency noise generators extends substantially across the spread spectrum.

21. A system for inhibiting wireless telecommunications as in claim 18 wherein the one or more control inputs comprise at least one control input that is based on detecting at least one condition of the aircraft.

* * * * *

UNITED STATES PATENT AND TRADEMARK OFFICE
CERTIFICATE OF CORRECTION

PATENT NO. : 7,653,385 B2
APPLICATION NO. : 09/770551
DATED : January 26, 2010
INVENTOR(S) : Arend et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1984 days.

Signed and Sealed this

Twenty-third Day of November, 2010

David J. Kappos
*Director of the United States Patent and Trademark Office*